United States Patent
Liao et al.

(10) Patent No.: US 7,834,862 B2
(45) Date of Patent: Nov. 16, 2010

(54) TOUCH SENSOR LAYOUT DESIGN

(75) Inventors: Shi-Yi Liao, Hsinchu (TW); Hsin-Hung Lee, Hsinchu (TW); Heng-Sheng Chou, Hsinchu (TW); Yao-Jen Hsieh, Hsinchu (TW); Meng-Hsiang Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 710 days.

(21) Appl. No.: 11/863,918

(22) Filed: Sep. 28, 2007

(65) Prior Publication Data

US 2009/0084611 A1    Apr. 2, 2009

(51) Int. Cl.
*G06F 3/041* (2006.01)

(52) U.S. Cl. ...................................... 345/173; 345/156

(58) Field of Classification Search ......... 345/156–173; 178/18.01–18.06
See application file for complete search history.

(56) References Cited

U.S. PATENT DOCUMENTS

| | | | |
|---|---|---|---|
| 5,543,589 A | 8/1996 | Buchana et al. | |
| 6,147,680 A | 11/2000 | Tareev | |
| 6,762,752 B2 * | 7/2004 | Perski et al. | 345/173 |
| 7,129,935 B2 | 10/2006 | Mackey | |
| 7,202,859 B1 * | 4/2007 | Speck et al. | 345/174 |
| 7,656,392 B2 * | 2/2010 | Bolender | 345/173 |
| 2006/0192262 A1 | 8/2006 | Kikuchi | |
| 2007/0273560 A1 * | 11/2007 | Hua et al. | 341/33 |
| 2008/0007534 A1 * | 1/2008 | Peng et al. | 345/173 |
| 2008/0111795 A1 * | 5/2008 | Bollinger | 345/173 |
| 2010/0085322 A1 * | 4/2010 | Mamba et al. | 345/173 |
| 2010/0182257 A1 * | 7/2010 | Kang et al. | 345/173 |
| 2010/0182259 A1 * | 7/2010 | Jung et al. | 345/173 |
| 2010/0214247 A1 * | 8/2010 | Tang et al. | 345/173 |

\* cited by examiner

*Primary Examiner*—Nitin Patel
(74) *Attorney, Agent, or Firm*—Tim Tingkang Xia; Morris, Manning & Martin, LLP

(57) ABSTRACT

The present invention relates to a touch sensing device. In one embodiment, the touch sensing device includes a plurality of sensor units arranged in the form of an M×N matrix having M rows and N columns. Each sensor unit has a first touch sensor, $S_{1,1}$, a second touch sensor, $S_{1,2}$, a third touch sensor, $S_{2,2}$, and a fourth touch sensor, $S_{2,1}$, arranged in the form of a 2×2 matrix, where the first touch sensor $S_{1,1}$ is connected to the third touch sensor $S_{2,2}$, and the second touch sensor $S_{1,2}$ is connected to the fourth touch sensor $S_{2,1}$, respectively. The touch sensing device further includes a number of control lines having M row control lines and N column control lines. Each row control line is adapted for connecting sequentially the sensor units of a corresponding row, and each column control line is adapted for connecting sequentially the sensor units of a corresponding column.

14 Claims, 6 Drawing Sheets

TOUCH SENSOR LAYOUT DESIGN

FIELD OF THE INVENTION

The present invention relates generally to a touch sensing device, and more particularly to touch sensor layouts of a touch sensing device.

BACKGROUND OF THE INVENTION

Touch sensing technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch screen associated with the plurality of touch sensors.

There are at least two types of touch sensors available for detection of a touch location. One is a resistive touch sensor that includes two layers of transparent conductive material, such as a transparent conductive oxide, separated by a gap. When touched with sufficient force, one of the conductive layers flexes to make contact with the other conductive layer. The location of the contact point is detectable by a controller that senses the change in resistance at the contact point. In response, the controller performs a function, if any, associated with the contact point. The other is a capacitive touch sensor that typically includes a single conductive layer for touch detection. A finger touch to the sensor provides a capacitively coupled path from the conductive layer through the body to earth ground. The location of the contact point is detectable by a controller that measures a change in a capacitively coupled electrical signal at the touch location. Accordingly, the controller performs a function, if any, associated with the touch location.

FIG. 5 shows a typical layout of a plurality of touch sensors in a touch sensing device. The plurality of touch sensors $\{S_{i,j}\}$ are arranged in the form of a matrix having m rows and n columns, where $i=1, 2, 3, \ldots, m$, and $j=1, 2, 3, \ldots, n$. For the touch sensors $\{S_{i,J}\}$ of the J-th column, each is connected to one another in series by a control line, $X_J$, along the direction of the J-th column, where $J=1, 3, 5, \ldots (n-1)$ for n being an even integer, or $J=1, 3, 5, \ldots, n$ for n being an odd integer. For the touch sensors $\{S_{i,K}\}$ of the remaining columns, i.e., $K=2, 4, 6, \ldots n$ for n being an even integer, or $J=2, 4, 6, \ldots, n-1$ for n being an odd integer, each of the touch sensors $\{S_{i,K}\}$ in the i-th row is connected to one another in series by a control line, $Y_i$, along the direction of the i-th row, where $i=1, 2, 3, \ldots, m$. The control lines $X_J$ and $Y_i$, in turn, are connected to a controller (not shown). Preferably, the control lines $X_J$ and $Y_i$ are conductive wires and are separated by an insulator, as shown in FIG. 6.

For such a touch sensor layout, however, there are several drawbacks. First, at least $[m+(n/2)]$ control lines for N being an even integer or $[m+((n+1)/2)]$ control lines for n being an odd integer are needed to connect the (m×n) touch sensors $\{S_{i,j}\}$ to the controller in this sensor layout. For a touch sensing device having a large number of touch sensors, the sensor layout poses the great challenge and difficulty in manufacturing. Furthermore, the use of a large number of control lines may result in a great amount of impedances, thereby lapsing the response time and reducing the sensitivity of the sensing circuit. Second, the sensing resolution of the touch sensing device in the X (row) direction is different from that in the Y (column) direction.

Therefore, a heretofore unaddressed need exists in the art to address the aforementioned deficiencies and inadequacies.

SUMMARY OF THE INVENTION

The present invention, in one aspect, relates to a touch sensing device. In one embodiment, the touch sensing device includes a plurality of X touch sensors and a plurality of Y touch sensors forming a sensor matrix having M rows and N columns, wherein the plurality of X touch sensors and the plurality of Y touch sensors are alternately arranged in each of the M rows and each of the N columns, and where M, N are a positive integer greater than 1.

Furthermore, the touch sensing device includes N/2 column control lines for N being an even integer or (N+1)/2 column control lines for N being an odd integer. For N being an even integer, the j-th column control line connects each X touch sensor in a pair of the (2j−1)-th column and the 2j-th column sequentially from the first row to the M-th row, where $j=1, 2, 3, \ldots, N/2$. For N being an odd integer, the j-th column control line connects each X touch sensor in a pair of the (2j−1)-th column and the 2j-th column sequentially from the first row to the M-th row, where $j=1, 2, 3, \ldots, (N-1)/2$, and the (N+1)/2-th column control line connects each X touch sensor in the N-th column sequentially from the first row to the M-th row.

Moreover, the touch sensing device includes M/2 row control lines for M being an even integer or (M+1)/2 row control lines for M being an odd integer. For M being an even integer, the k-th row control line connects each Y touch sensor in a pair of the (2k−1)-th row and the 2k-th row sequentially from the first column to the N-th column, where $k=1, 2, 3, \ldots, M/2$. For M being an odd integer, the k-th row control line connects each Y touch sensor in a pair of the (2k−1)-th row and the 2k-th row sequentially from the first column to the N-th column, where $j=1, 2, 3, \ldots, (M-1)/2$, and the (M+1)/2-th row control line connects each Y touch sensor in the M-th row sequentially from the first column to the N-th column.

Additionally, the touch sensing device includes a touch screen positioned over the sensing matrix such that each of the plurality of X touch sensors and the plurality of Y touch sensors is associated with coordinates of the touch screen at which the touch sensor is located. The touch sensing device further includes a controller. Each column control line and each row control line are addressably connected to the controller.

When the touch screen is touched, the touch location at the touch screen is detectable by the controller that measures a signal generated responsively by one or more of the plurality of X touch sensors and the plurality of Y touch sensors associated with the touch location. The controller may further perform a function associated with the touch location responsive to the measured signal.

In one embodiment, the plurality of X touch sensors is identical to or substantially different from the plurality of Y touch sensors. Each of the plurality of X touch sensors has a geometric shape of a triangle, a square, a rectangle, a polygon or a circle, and each of the plurality of Y touch sensors has a geometric shape of a triangle, a square, a rectangle, a polygon or a circle.

In one embodiment, each column control line and each row control line are electrically insulated from one another at crossover regions.

In another aspect, the present invention relates to a touch sensing device. In one embodiment, the touch sensing device includes a plurality of sensor units, $\{U_{i,j}\}$, arranged in the form of an M×N matrix having M rows and N columns, wherein i=1, 2, 3, ..., M, and j=1, 2, 3, ..., N, M, N being an positive integer greater than zero, wherein each sensor unit $U_{i,j}$ has a first touch sensor, $S_{1,1}$, a second touch sensor, $S_{1,2}$, a third touch sensor, $S_{2,2}$, and a fourth touch sensor, $S_{2,1}$, arranged in the form of a 2×2 matrix, the first touch sensor $S_{1,1}$ being electrically connected to the third touch sensor $S_{2,2}$, and the second touch sensor $S_{1,2}$ being electrically connected to the fourth touch sensor $S_{2,1}$, respectively.

The touch sensing device further includes a number of control lines having M row control lines and N column control lines, wherein each row control line has a first portion and a second portion adapted for connecting sequentially sensor units of a corresponding row; and each column control line has a first portion and a second portion adapted for connecting sequentially sensor units of a corresponding column, respectively, such that (i) the first touch sensor $S_{1,1}$ of a sensor unit $U_{i,j}$ is connected to the third touch sensor $S_{2,2}$ of an immediately prior sensor unit $U_{i,j-1}$, and the third touch sensor $S_{2,2}$ of the sensor unit $U_{i,j}$ is connected to the first touch sensor $S_{1,1}$ of an immediately next sensor unit $U_{i,j+1}$ by the i-th row control line along the i-th row direction, and the second touch sensor $S_{1,2}$ of the sensor unit $U_{i,j}$ is connected to the fourth touch sensor $S_{2,1}$ of an immediately prior sensor unit $U_{i-1,j}$, and the fourth touch sensor $S_{2,1}$ of the sensor unit $U_{i,j}$ is connected to the second touch sensor $S_{1,2}$ of an immediately next sensor unit $U_{i+1,j}$ by the j-th column control line along the j-th column; or (ii) the first touch sensor $S_{1,1}$ of a sensor unit $U_{i,j}$ is connected to the third touch sensor $S_{2,2}$ of an immediately prior sensor unit $U_{i-1,j}$, and the third touch sensor $S_{2,2}$ of the sensor unit $U_{i,j}$ is connected to the first touch sensor $S_{1,1}$ of an immediately next sensor unit $U_{i+1,j}$ by the j-th column control line along the j-th column direction, and the fourth touch sensor $S_{2,1}$ of the sensor unit $U_{i,j}$ is connected to the second touch sensor $S_{1,2}$ of an immediately prior sensor unit $U_{i,j-1}$, and the second touch sensor $S_{1,2}$ of the sensor unit $U_{i,j}$ is connected to the fourth touch sensor $S_{2,1}$ of an immediately next sensor unit $U_{i,j+1}$ by the i-th row control line along the i-th row direction.

The touch sensing device also includes a controller. The first portions of each row control line and each column control line are addressably connected to the controller.

The touch sensing device may include a touch screen positioned over the plurality of sensor units such that each of the first touch sensor $S_{1,1}$, the second touch sensor $S_{1,2}$, the third touch sensor $S_{2,2}$, and the fourth touch sensor $S_{2,1}$ of each sensor unit of the plurality of sensor units is associated with coordinates of the touch screen at which the touch sensor is located.

When the touch screen is touched, the touch location at the touch screen is detectable by the controller that measures a signal generated responsively by one or more touch sensors associated with the touch location.

In one embodiment, each of the first touch sensor $S_{1,1}$, the second touch sensor $S_{1,2}$, the third touch sensor $S_{2,2}$, and the fourth touch sensor $S_{2,1}$ has a geometric shape of a triangle, a square, a rectangle, a polygon or a circle.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the present invention and, together with the written description, serve to explain the principles of the present invention. Wherever possible, the same reference numbers are used throughout the drawings to refer to the same or like elements of an embodiment, and wherein.

DETAILED DESCRIPTION OF THE INVENTION

Figure 1:
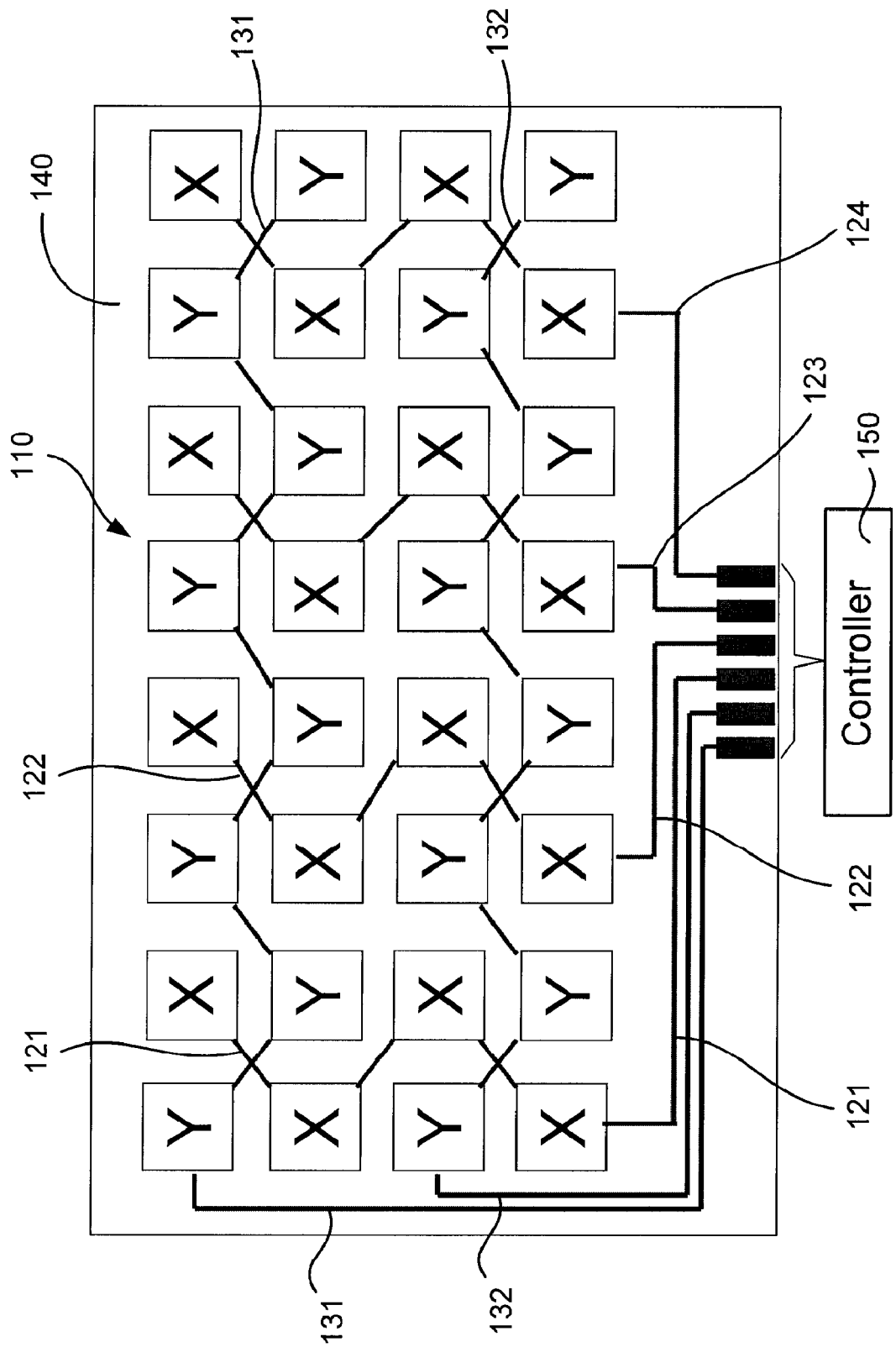
FIG. 1 shows schematically a top view of a touch sensor layout according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-4. In accordance with the purposes of this invention, as embodied and broadly described herein, this invention, in one aspect, relates to a touch sensing device.

FIG. 1 shows schematically a top view of a touch sensing device 100 according to one embodiment of the present invention. The touch sensing device 100 includes a plurality of X touch sensors, {X}, and a plurality of Y touch sensors, {Y}, forming a sensor matrix 110 having four (4) rows and eight (8) columns. Other numbers of rows and columns can also be utilized to practice the present invention.

The plurality of X touch sensors {X} and the plurality of Y touch sensors {Y} can be same or different. In this embodiment, each of the plurality of X touch sensors {X} and the plurality of Y touch sensors {Y} has a geometric shape of a square. Other shapes such as a triangle, a rectangle, a polygon, or a circle, can also be utilized to practice the present invention. Each of the plurality of X touch sensors and the plurality of Y touch sensors, for example, is formed of a conductive material, wherein the conductive material includes a transparent conductive materials (such as an indium tin oxide (ITO), an indium zinc oxide (IZO), an cadmium tin oxide (CTO), cadmium zinc oxide (CZO), aluminum zinc oxide (AZO), aluminum tin oxide (ATO), hafnium oxide (HfO), indium tin zinc oxide (ITZO), zinc oxide, others, or combinations thereof), non-transparent conductive materials (such Au, Ag, Cu, Fe, Sn, Pb, Cd, Mo, Al, Ti, Ta, Hf, others, oxide thereof, nitride thereof, oxy-nitride thereof, alloy thereof, or combinations thereof), or combinations thereof. In this embodiment, the conductive material such as an ITO acts as the exemplary of the present invention.

As shown in FIG. 1, the plurality of X touch sensors {X} and the plurality of Y touch sensors {Y} are alternately arranged in each row and each column, and connected by four (4) column control lines 121-124, and two (2) row control lines 131 and 132, respectively. For example, the first touch sensors {X} in the first and second columns are connected sequentially from the first row to the fourth row by the column control line 121; the first touch sensors {X} in the third and fourth columns are connected sequentially from the first row to the fourth row by the row control line 122, . . . , the first touch sensors {X} in the seventh and eighth columns are connected sequentially from the first row to the fourth row by the fourth control line 124. For the second touch sensors {Y}, they are connected along the row direction. As shown in FIG. 1, the second touch sensors {Y} in the first row and the second row are connected sequentially from the first column to the eighth column by the row control line 131, and the second touch sensors {Y} in the third row and the fourth row are connected sequentially from the first column to the eighth column by the row control line 132.

All these four column control lines 121-124 and two row control lines 131 and 132, in turn, are connected to a controller 150. These column control lines 121-124 and row control lines 131 and 132 are formed of the conductive material so as to transmit signal. Each column control line and each row control line are electrically insulated from one another at crossover regions.

A transparent touch screen 140 is positioned over the sensing matrix 110 such that each of the plurality of X touch sensors {X} and the plurality of Y touch sensors {Y} is associated with coordinates of the touch screen 140 at which the touch sensor is located. When the touch screen 140 is touched, the touch location at the touch screen 140 is detectable by the controller 150 that measures a signal generated responsively by one or more of the plurality of X touch sensors {X} and the plurality of Y touch sensors {Y} associated with the touch location. The controller 150 performs a function, if any, associated with the touch location responsive to the measured signal.

Figure 5:
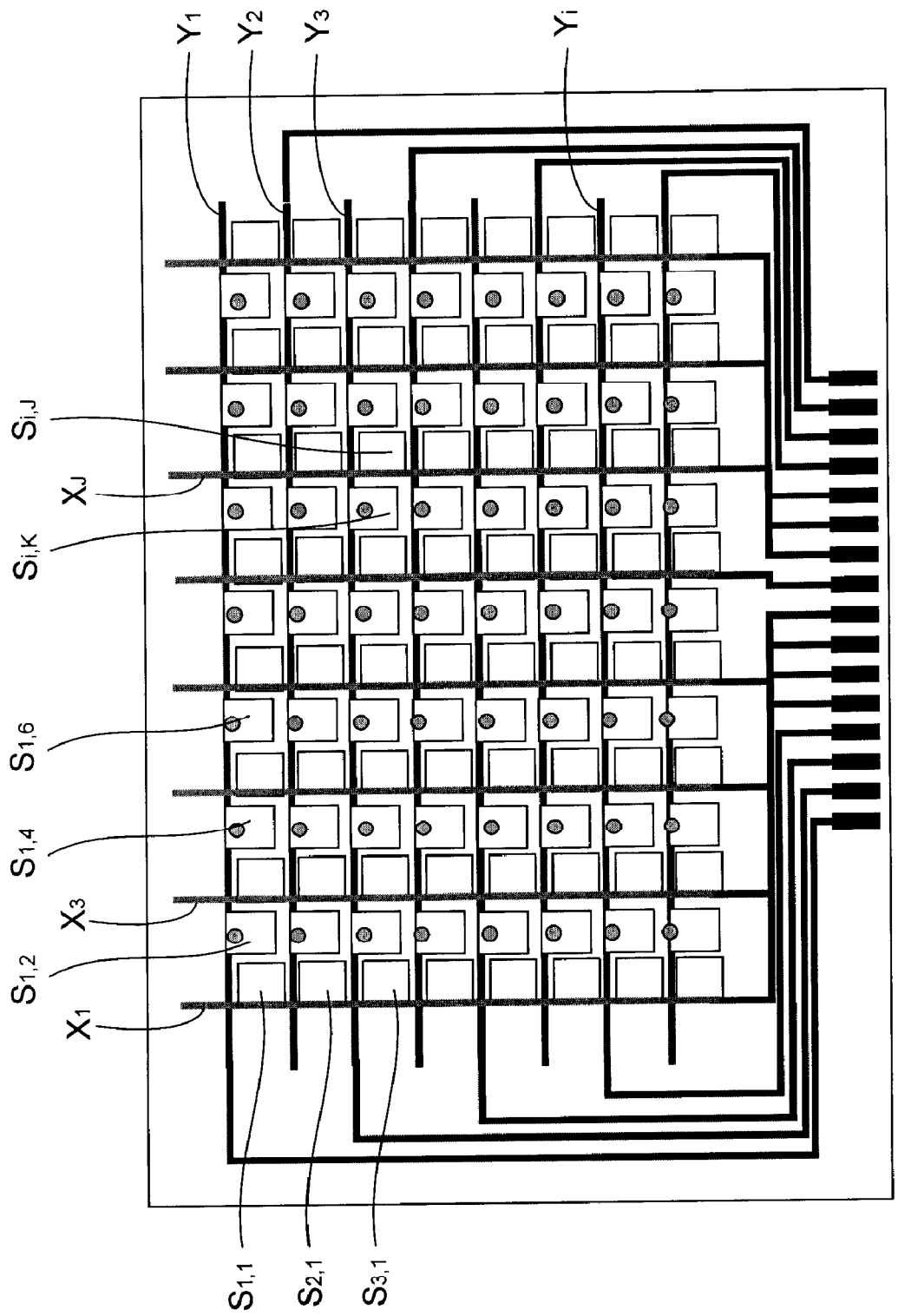
FIG. 5 shows schematically a top view of a conventional touch sensor layout.
Figure 6:
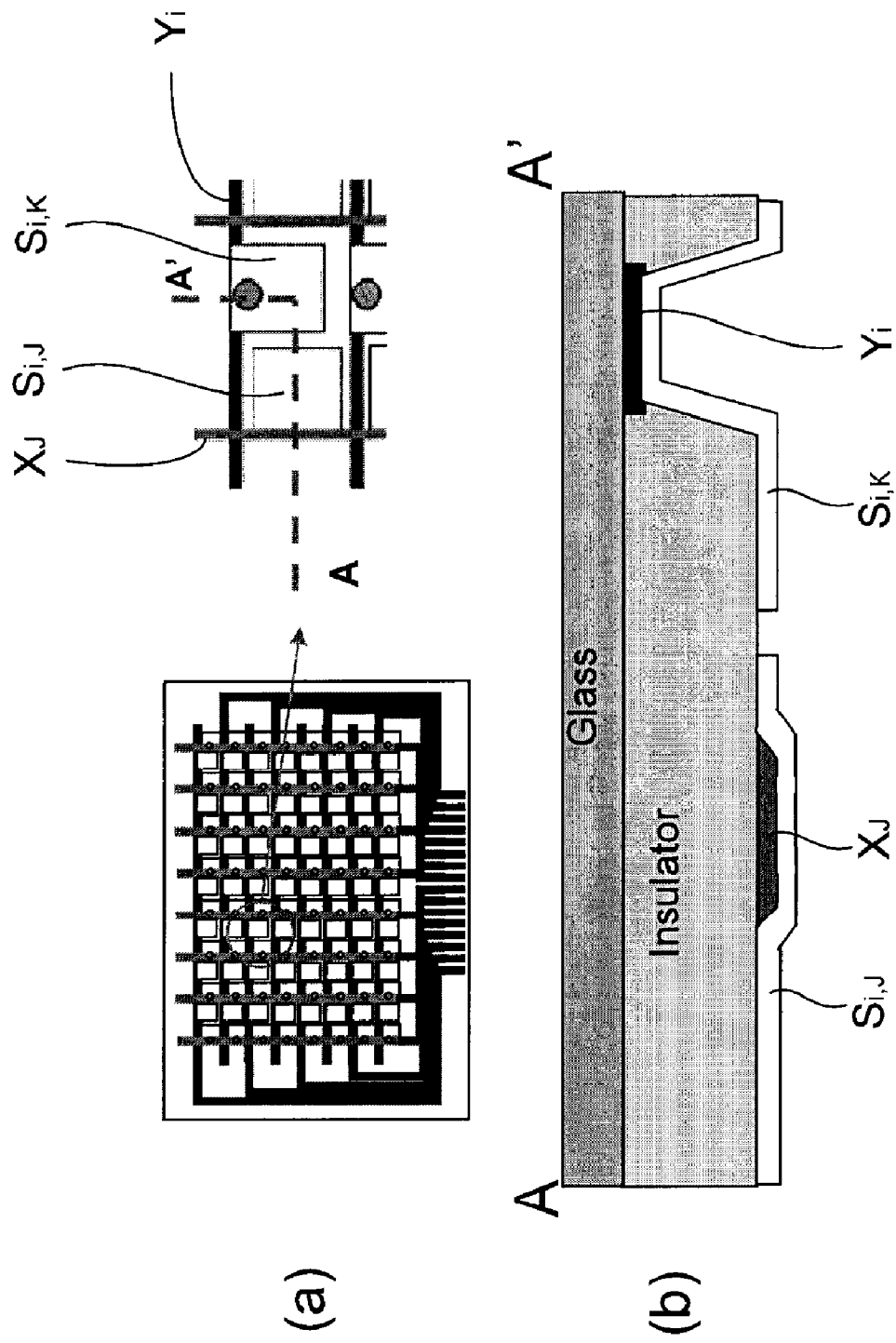
FIG. 6 shows schematically (a) a top view of the conventional touch sensor layout of FIG. 5, and (b) a cross-sectional view along line A-A'.

Comparing to the conventional sensor layout design shown in FIGS. 5 and 6, the sensor layout according to the present invention adopts few control lines to connect touch sensor {X} and {Y} to the controller 150, which results in reduction of impedance and increase of sensitivity. Furthermore, the resolution in both the X (row) direction and the Y (column) direction are same in the invented sensor layout design.

Figure 2:
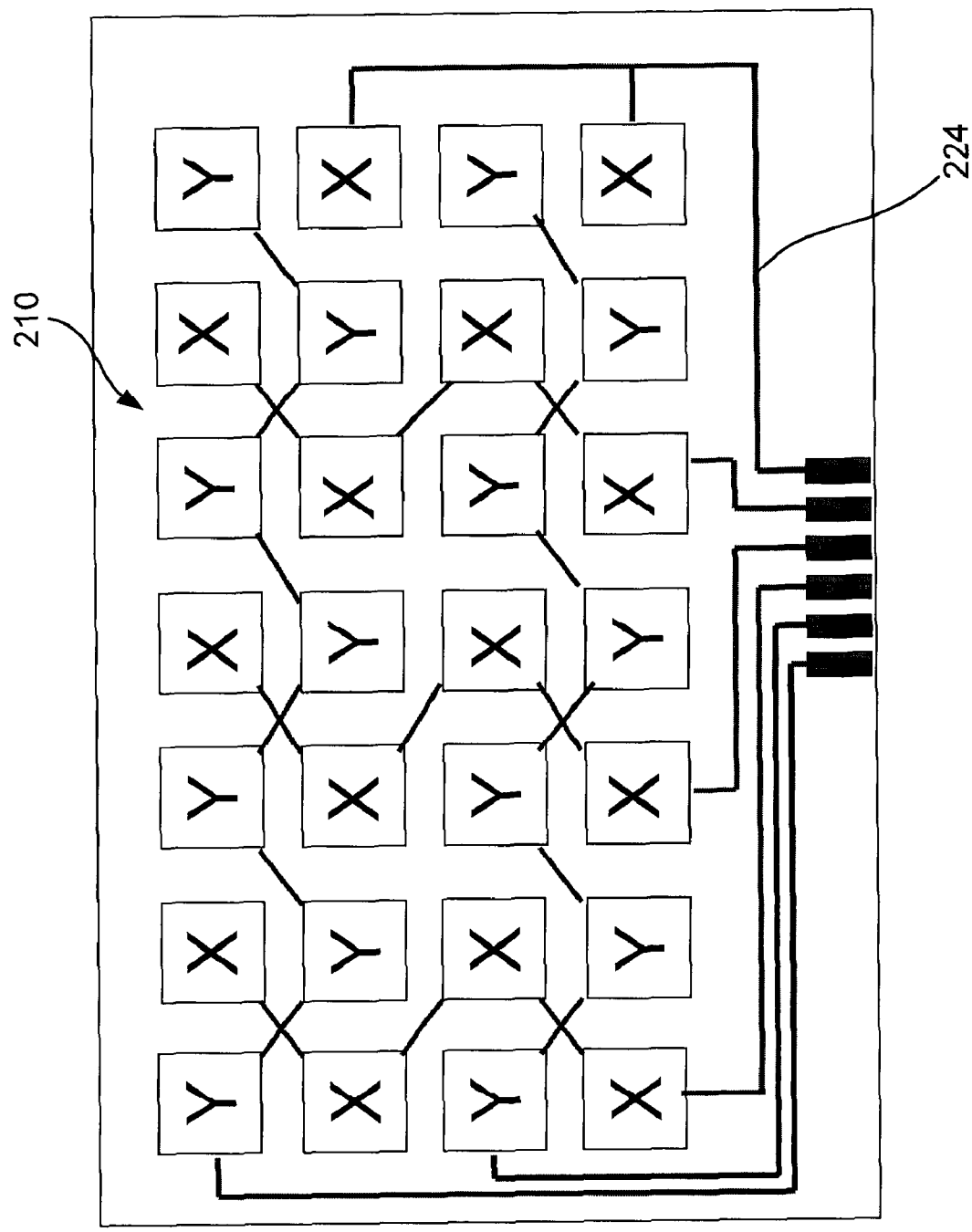
FIG. 2 shows schematically a top view of a touch sensor layout according to another embodiment of the present invention.

FIG. 2 shows schematically a top view of a touch sensing device 200 according to another embodiment of the present invention. The touch sensing device 200 has a sensor layout design similar to that of the sensor device 100 shown in FIG. 1, except that a sensor matrix 210 has four (4) rows and seven (7) columns. In this embodiment, the fourth column control line 224 connects only those of the plurality of X touch sensors {X} of the seventh column.

Figure 3:
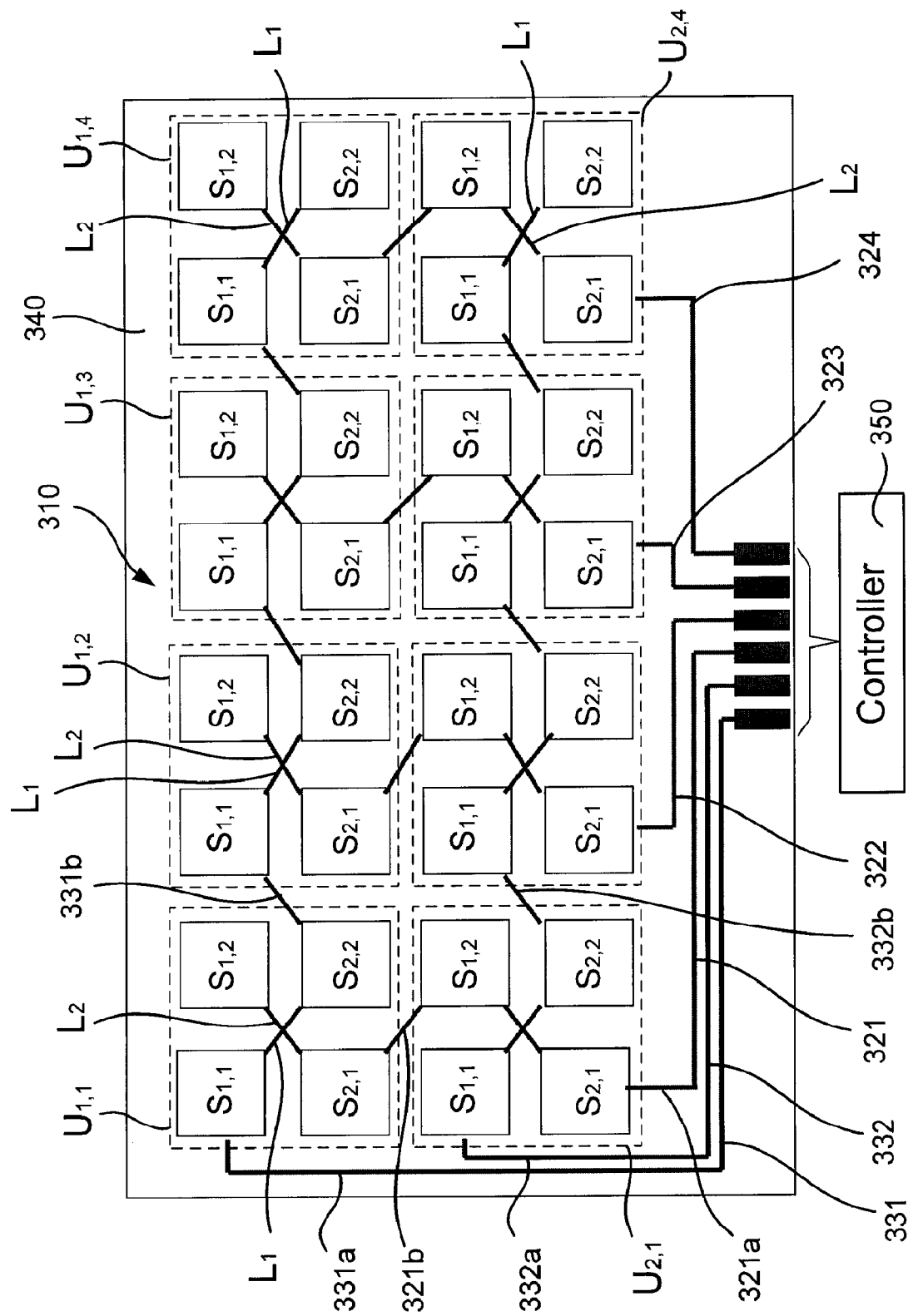
FIG. 3 shows schematically a top view of a touch sensor layout according to yet another embodiment of the present invention.

Referring to FIG. 3, a touch sensing device 300 is schematically shown according to one embodiment of the present invention. The touch sensing device 300 includes a plurality of sensor units, $\{U_{i,j}\}$, arranged in the form of a 2×4 matrix 310 having two (2) rows and four (4) columns, where i=1, 2, and j=1, 2, 3, 4. Other numbers of rows and columns can also be utilized to practice the present invention.

Each sensor unit $U_{i,j}$ has a first touch sensor, $S_{1,1}$, a second touch sensor, $S_{1,2}$, a third touch sensor, $S_{2,2}$, and a fourth touch sensor, $S_{2,1}$, arranged in the form of a 2×2 matrix. The first touch sensor $S_{1,1}$ is connected to the third touch sensor $S_{2,2}$ by a conductive lead $L_1$. The second touch sensor $S_{1,2}$ is connected to the fourth touch sensor $S_{2,1}$ by a conductive lead $L_2$.

Each of the first touch sensor $S_{1,1}$, the second touch sensor $S_{1,2}$, the third touch sensor $S_{2,2}$, and the fourth touch sensor $S_{2,1}$ has a geometric shape of a triangle, a square, a rectangle, a polygon or a circle. In this exemplary embodiment shown in FIG. 3, the geometric shape is a square. Each of the first touch sensor $S_{1,1}$, the second touch sensor $S_{1,2}$, the third touch sensor $S_{2,2}$, and the fourth touch sensor $S_{2,1}$, for example, is formed of a conductive material, wherein the conductive material includes a transparent conductive materials (such as an indium tin oxide (ITO), an indium zinc oxide (IZO), an cadmium tin oxide (CTO), cadmium zinc oxide (CZO), aluminum zinc oxide (AZO), aluminum tin oxide (ATO), hafnium oxide (HfO), indium tin zinc oxide (ITZO), zinc oxide, others, or combinations thereof), non-transparent conductive materials (such Au, Ag, Cu, Fe, Sn, Pb, Cd, Mo, Al, Ti, Ta, Hf, others, oxide thereof, nitride thereof, oxy-nitride thereof, alloy thereof, or combinations thereof), or combinations thereof. In this embodiment, the conductive material such as an ITO acts as the exemplary of the present invention.

A touch screen 340 is positioned over the plurality of sensor units $\{U_{i,j}\}$. Each of the first touch sensor $S_{1,1}$, the second touch sensor $S_{1,2}$, the third touch sensor $S_{2,2}$, and the fourth touch sensor $S_{2,1}$ of each sensor unit of the plurality of sensor units is associated with coordinates of the touch screen at which the touch sensor is located.

The sensor units in each row are connected in series by a corresponding row control lines, and the sensor units in each column are connected in series by a corresponding column control lines. These row control lines and column row control lines are formed of the conductive material so as to transmit signal.

As shown in FIG. 3, for the first row of the sensor unit matrix 310, the third touch sensor $S_{2,2}$ of the sensor unit $U_{1,1}$ is connected to the first touch sensor $S_{1,1}$ of its immediately next sensor unit $U_{1,2}$, the third touch sensor $S_{2,2}$ of the sensor unit $U_{1,2}$ is connected to the first touch sensor $S_{1,1}$ of its unit $U_{1,3}$, and the third touch sensor $S_{2,2}$ of the sensor unit $U_{1,3}$ is connected to the first touch sensor $S_{1,1}$ of an immediately next sensor unit $U_{1,4}$, by the second portion 331b of the first row control line 331. The first touch sensor $S_{1,1}$ of the sensor unit $U_{1,1}$ is connected to a controller 350 by the first portion 331a of the first row control line 331. Alternatively, the first row of the sensor unit matrix can also be connected to the controller 350 by the first portion 331a of the first row control line 331 through the third touch sensor $S_{2,2}$ of the sensor unit $U_{1,4}$ or through an else touch sensor of some sensor unit.

Similarly, the sensor units of the second row of are connected in series by the second portion 332b of the second control line 332. The sensor units of the second row is also connected to the controller 350 by the first portion 332a of the second row control line 332 through the first touch sensor $S_{1,1}$ of the sensor unit $U_{2,1}$. Alternatively, the second row of the sensor unit matrix can also be connected to the controller 350 by the first portion 332a of the second row control line 332 through the third touch sensor $S_{2,2}$ of the sensor unit $U_{2,4}$ or through else touch sensor of some sensor unit.

For the first column of the sensor unit matrix 310, the fourth touch sensor $S_{2,1}$ of the sensor unit $U_{1,1}$ is connected to the second touch sensor $S_{1,2}$ of its immediately next sensor unit $U_{2,1}$ by the second portion 321b of the first column control line 321. The fourth touch sensor $S_{2,1}$ of the sensor unit $U_{2,1}$ is connected to the controller 350 by the first portion 321a of the first column control line 321. Alternatively, the first column of the sensor unit matrix can also be connected to the controller 350 by the first portion 321a of the first column control line 321 through the second touch sensor $S_{1,2}$ of the sensor unit $U_{1,1}$ or through else touch sensor of some sensor unit.

Similar to the above configuration, the sensor units of the second, third and fourth columns are connected in series by the second, third and fourth control lines 322, 323 and 324, respectively.

When the touch screen 340 is touched, the touch location at the touch screen 340 is detectable by the controller 350 that measures a signal generated responsively by one or more touch sensors associated with the touch location.

For such a sensor layout, there are few control lines used to connect touch sensors to the controller 350, comparing to the conventional sensor layout design shown in FIGS. 5 and 6, which results in reduction of impedance and increase of sensitivity. Furthermore, the resolution in both the X (row) direction and the Y (column) direction are same in the invented sensor layout design.

Figure 4:
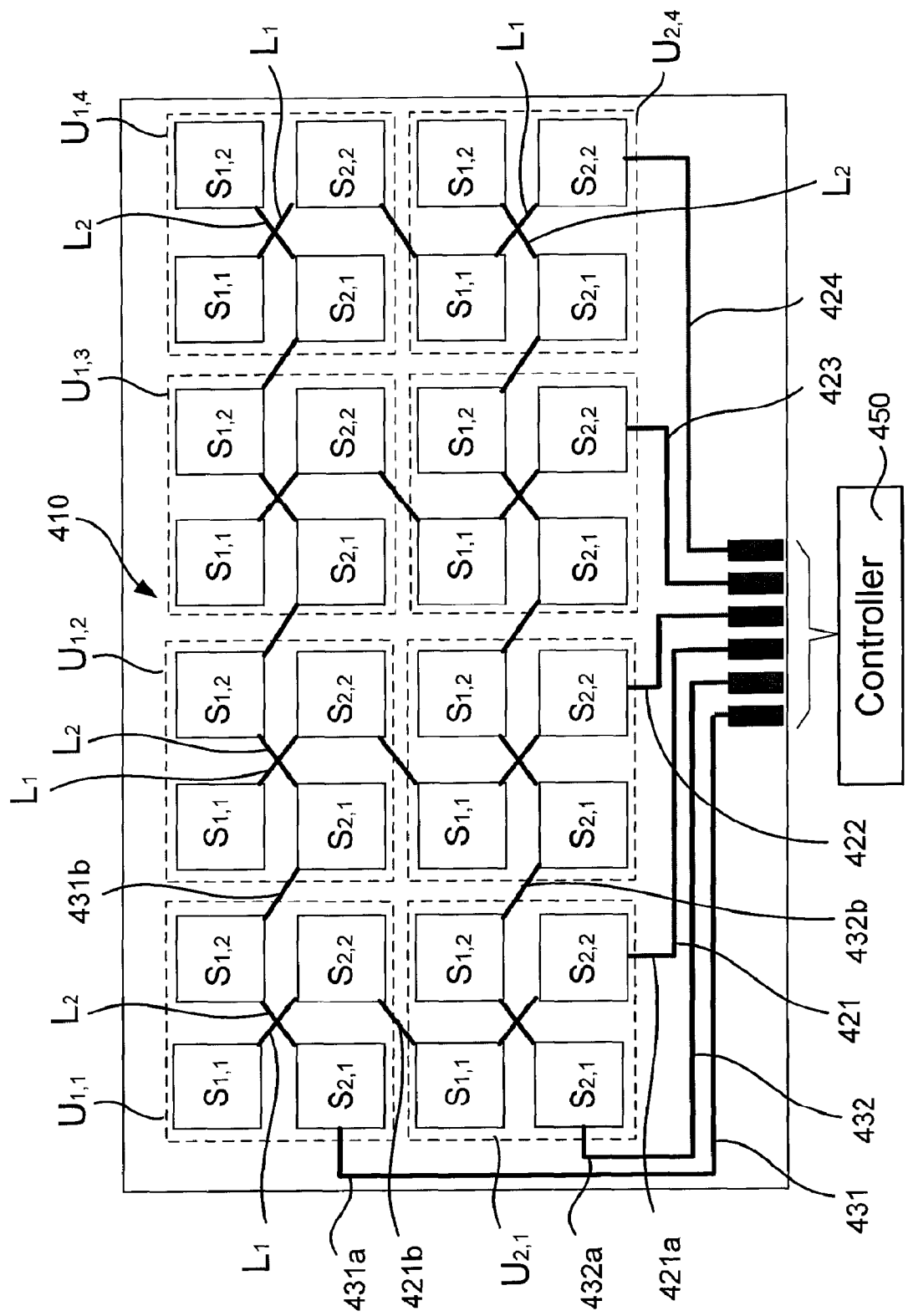
FIG. 4 shows schematically a top view of a touch sensor layout according to an alternative embodiment of the present invention.

FIG. 4 shows schematically an alternative embodiment of a touch sensing device 400 according the present invention. Similar to the sensor device 300 shown in FIG. 3, the touch sensing device 400 has a sensor layout of a 2×4 sensor unit matrix 410. Each sensor unit $U_{i,j}$ has a first touch sensor, $S_{1,1}$, a second touch sensor, $S_{1,2}$, a third touch sensor, $S_{2,2}$, and a fourth touch sensor, $S_{2,1}$, arranged in the form of a 2×2 matrix. The first touch sensor $S_{1,1}$ is connected to the third touch sensor $S_{2,2}$ by a conductive lead $L_1$. The second touch sensor $S_{1,2}$ is connected to the fourth touch sensor $S_{2,1}$ by a conductive lead $L_2$.

However, the connection of the touch sensors is different from that of the sensor device 300 shown in FIG. 3. As shown in FIG. 4, for the first row of the sensor unit matrix 410, the second touch sensor $S_{1,2}$ of the sensor unit $U_{1,1}$ is connected to the fourth touch sensor $S_{2,1}$ of its immediately next sensor unit $U_{1,2}$, the second touch sensor $S_{1,2}$ of the sensor unit $U_{1,2}$ is connected to the fourth touch sensor $S_{2,1}$ of its immediately next sensor unit $U_{1,3}$, and the second touch sensor $S_{1,2}$ of the sensor unit $U_{1,3}$ is connected to the fourth touch sensor $S_{2,1}$ of an immediately next sensor unit $U_{1,4}$, by the second portion 431b of the first row control line 431. The fourth touch sensor $S_{2,1}$ of the sensor unit $U_{1,1}$ is connected to a controller 450 by the first portion 431a of the first row control line 431. Alternatively, the first row of the sensor unit matrix can also be connected to the controller 450 by the first portion 431a of the first row control line 431 through the second touch sensor $S_{1,2}$ of the sensor unit $U_{1,4}$ or through else touch sensor of some sensor unit.

Similarly, the sensor units of the second row of are connected in series by the second portion 432b of the second control line 432. The sensor units of the second row is also connected to the controller 450 by the first portion 432a of the second row control line 432 through the fourth touch sensor $S_{2,1}$ of the sensor unit $U_{2,1}$. Alternatively, the second row of the sensor unit matrix can also be connected to the controller 450 by the second portion 432b of the second row control line 432 through the second touch sensor $S_{1,2}$ of the sensor unit $U_{2,4}$ or through else touch sensor of some sensor unit.

For the first column of the sensor unit matrix 410, the third touch sensor $S_{2,2}$ of the sensor unit $U_{1,1}$ is connected to the first touch sensor $S_{1,1}$ of its immediately next sensor unit $U_{2,1}$ by the second portion 421b of the first column control line 421. The third touch sensor $S_{2,2}$ of the sensor unit $U_{2,1}$ is connected to the controller 450 by the first portion 421a of the first column control line 421. Alternatively, the first column of the sensor unit matrix can also be connected to the controller 450 by the first portion 421a of the first column control line 421 through the first touch sensor $S_{1,1}$ of the sensor unit $U_{1,1}$ or through else touch sensor of some sensor unit.

Similar to the above configuration, the sensor units of the second, third and fourth columns are connected in series by the second, third and fourth control lines 422, 423 and 424, respectively.

The present invention, among other things, discloses a variety of sensor layouts of a touch sensing device, which utilizes few control lines to connect the touch sensors, thereby reducing impedance and increasing the sensitivity of touches, and has the same resolution in both the X (row) direction and the Y (column) direction.

Furthermore, the above-mentioned embodiments of the sensor layouts of a touch sensing device can be disposed in the substrate within a plurality of the pixels of the display panel or in a blank substrate. The sensor layouts a touch sensing device can be positioned into at least portion of the pixels and/or into a region without the pixels while the sensor layouts of a touch sensing device is disposed in the substrate of the display panel. The blank substrate must be combined with the display panel while the sensor layouts of a touch sensing device are disposed in the blank substrate.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A touch sensing device, comprising:
   a plurality of X touch sensors and a plurality of Y touch sensors forming a sensor matrix having M rows and N columns, wherein the plurality of X touch sensors and the plurality of Y touch sensors are alternately arranged in each of the M rows and each of the N columns, and wherein each of M and N is a positive integer greater than 1;
   N/2 column control lines for N being an even integer or (N+1)/2 column control lines for N being an odd integer, wherein for N being an even integer, the j-th column control line connects each X touch sensor in a pair of the (2j−1)-th column and the 2j-th column sequentially from the first row to the M-th row, wherein j=1, 2, 3, ..., N/2, and wherein for N being an odd integer, the j-th column control line connects each X touch sensor in a pair of the (2j−1)-th column and the 2j-th column sequentially from the first row to the M-th row, wherein j=1, 2, 3, ..., (N−1)/2, and the (N+1)/2-th column control line connects each X touch sensor in the N-th column sequentially from the first row to the M-th row; and M/2 row control lines for M being an even integer or (M+1)/2 row control lines for M being an odd integer, wherein for M being an even integer, the k-th row control line connects each Y touch sensor in a pair of the (2k−1)-th row and the 2k-th row sequentially from the first column to the N-th column, wherein k=1, 2, 3, . . . , M/2, and wherein for M being an odd integer, the k-th row control line connects each Y touch sensor in a pair of the (2k−1)-th row and the 2k-th row sequentially from the first column to the N-th column, wherein j=1, 2, 3, . . . , (M−1)/2, and the (M+1)/2-th row control line connects each Y touch sensor in the M-th row sequentially from the first column to the N-th column.

2. The touch sensing device of claim 1, further comprising a controller, wherein each column control line and each row control line are addressably connected to the controller.

3. The touch sensing device of claim 2, further comprising a touch screen positioned over the sensing matrix such that each of the plurality of X touch sensors and the plurality of Y touch sensors is associated with coordinates of the touch screen at which the touch sensor is located.

4. The touch sensing device of claim 3, wherein when the touch screen is touched, the touch location at the touch screen is detectable by the controller that measures a signal generated responsively by one or more of the plurality of X touch sensors and the plurality of Y touch sensors associated with the touch location.

5. The touch sensing device of claim 4, wherein the controller further performs a function associated with the touch location responsive to the measured signal.

6. The touch sensing device of claim 1, wherein the plurality of X touch sensors is identical to or substantially different from the plurality of Y touch sensors.

7. The touch sensing device of claim 1, wherein each of the plurality of X touch sensors has a geometric shape of a triangle, a square, a rectangle, a polygon or a circle, and wherein each of the plurality of Y touch sensors has a geometric shape of a triangle, a square, a rectangle, a polygon or a circle.

8. The touch sensing device of claim 1, wherein each column control line and each row control line are electrically insulated from one another at crossover regions.

9. A touch sensing device, comprising:

a plurality of sensor units, $\{U_{i,j}\}$, arranged in the form of an M×N matrix having M rows and N columns, wherein i=1, 2, 3, . . . , M, and j=1, 2, 3, . . . , N, M, N being an positive integer greater than zero, wherein each sensor unit $U_{i,j}$ has a first touch sensor, $S_{1,1}$, a second touch sensor, $S_{1,2}$, a third touch sensor, $S_{2,2}$, and a fourth touch sensor, $S_{2,1}$, arranged in the form of a 2×2 matrix, the first touch sensor $S_{1,1}$ being connected to the third touch sensor $S_{2,2}$, and the second touch sensor $S_{1,2}$ being connected to the fourth touch sensor $S_{2,1}$, respectively; and a number of control lines having M row control lines and N column control lines, wherein each row control line has a first portion and a second portion adapted for connecting sequentially sensor units of a corresponding row; and each column control line has a first portion and a second portion adapted for connecting sequentially sensor units of a corresponding column, respectively, such that (i) the first touch sensor $S_{1,1}$ of a sensor unit $U_{i,j}$ is connected to the third touch sensor $S_{2,2}$ of an immediately prior sensor unit $U_{i,j-1}$, and the third touch sensor $S_{2,2}$ of the sensor unit $U_{i,j}$ is connected to the first touch sensor $S_{1,1}$ of an immediately next sensor unit $U_{i,j+1}$ by the i-th row control line along the i-th row direction, and the second touch sensor $S_{1,2}$ of the sensor unit $U_{i,j}$ is connected to the fourth touch sensor $S_{2,1}$ of an immediately prior sensor unit $U_{i-1,j}$, and the fourth touch sensor $S_{2,1}$ of the sensor unit $U_{i,j}$ is connected to the second touch sensor $S_{1,2}$ of an immediately next sensor unit $U_{i+1,j}$ by the j-th column control line along the j-th column; or (ii) the first touch sensor $S_{1,1}$ of a sensor unit $U_{i,j}$ is connected to the third touch sensor $S_{2,2}$ of an immediately prior sensor unit $U_{i-1,j}$, and the third touch sensor $S_{2,2}$ of the sensor unit $U_{i,j}$ is connected to the first touch sensor $S_{1,1}$ of an immediately next sensor unit $U_{i+1,j}$ by the j-th column control line along the j-th column direction, and the fourth touch sensor $S_{2,1}$ of the sensor unit $U_{i,j}$ is connected to the second touch sensor $S_{1,2}$ of an immediately prior sensor unit $U_{i,j-1}$, and the second touch sensor $S_{1,2}$ of the sensor unit $U_{i,j}$ is connected to the fourth touch sensor $S_{2,1}$ of an immediately next sensor unit $U_{i,j+1}$ by the i-th row control line along the i-th row direction.

10. The touch sensing device of claim 9, further comprising a controller, wherein the first portions of each row control line and each column control line are addressably connected to the controller.

11. The touch sensing device of claim 10, further comprising a touch screen positioned over the plurality of sensor units such that each of the first touch sensor $S_{1,1}$, the second touch sensor $S_{1,2}$, the third touch sensor $S_{2,2}$, and the fourth touch sensor $S_{2,1}$ of each sensor unit of the plurality of sensor units is associated with coordinates of the touch screen at which the touch sensor is located.

12. The touch sensing device of claim 11, wherein when the touch screen is touched, the touch location at the touch screen is detectable by the controller that measures a signal generated responsively by one or more touch sensors associated with the touch location.

13. The touch sensing device of claim 9, wherein each of the first touch sensor $S_{1,1}$, the second touch sensor $S_{1,2}$, the third touch sensor $S_{2,2}$, and the fourth touch sensor $S_{2,1}$ is identical to or substantially different from one another.

14. The touch sensing device of claim 9, wherein each of the first touch sensor $S_{1,1}$, the second touch sensor $S_{1,2}$, the third touch sensor $S_{2,2}$, and the fourth touch sensor $S_{2,1}$ has a geometric shape of a triangle, a square, a rectangle, a polygon or a circle.

* * * * *